United States Patent
Tan et al.

(10) Patent No.: US 11,645,514 B2
(45) Date of Patent: May 9, 2023

(54) OUT-OF-DOMAIN ENCODER TRAINING

(71) Applicant: International Business Machines Corporation, Armonk, NY (US)

(72) Inventors: Ming Tan, Malden, MA (US); Dakuo Wang, Cambridge, MA (US); Mo Yu, Clifton, NJ (US); Haoyu Wang, Somerville, MA (US); Yang Yu, Acton, MA (US); Shiyu Chang, Elmsford, NY (US); Saloni Potdar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 950 days.

(21) Appl. No.: 16/530,457

(22) Filed: Aug. 2, 2019

(65) Prior Publication Data

US 2021/0034965 A1    Feb. 4, 2021

(51) Int. Cl.
G06N 3/08 (2023.01)
G06F 17/16 (2006.01)
G06N 20/00 (2019.01)

(52) U.S. Cl.
CPC ............... *G06N 3/08* (2013.01); *G06N 20/00* (2019.01); *G06F 17/16* (2013.01)

(58) Field of Classification Search
None
See application file for complete search history.

(56) References Cited

U.S. PATENT DOCUMENTS

2017/0300822 A1* 10/2017 Limonad ............... G06V 40/25
2018/0068231 A1    3/2018 Sharma et al.
2018/0174071 A1    6/2018 Ghatt et al.

FOREIGN PATENT DOCUMENTS

CN         108460134 A    8/2018

OTHER PUBLICATIONS

Zhao H, Yap KH, Kot AC, Duan L, Cheung NM. Few-shot and many-shot fusion learning in mobile visual food recognition. In2019 IEEE International Symposium on Circuits and Systems (ISCAS) May 26, 2019 (pp. 1-5). IEEE. (Year: 2019).*

(Continued)

*Primary Examiner* — Vincent Gonzales
(74) *Attorney, Agent, or Firm* — Aaron Pontikos

(57) ABSTRACT

A computer-implemented method includes using an embedding network to generate prototypical vectors. Each prototypical vector is based on a corresponding label associated with a first domain. The computer-implemented method also includes using the embedding network to generate an in-domain test vector based on at least one data sample from a particular label associated with the first domain and using the embedding network to generate an out-of-domain test vector based on at least one other data sample associated with a different domain. The computer-implemented method also includes comparing the prototypical vectors to the in-domain test vector to generate in-domain comparison values and comparing the prototypical vectors to the out-of-domain test vector to generate out-of-domain comparison values. The computer-implemented method also includes modifying, based on the in-domain comparison values and the out-of-domain comparison values, one or more parameters of the embedding network.

20 Claims, 8 Drawing Sheets

(56) References Cited

OTHER PUBLICATIONS

Anonymous, et al., "Meta-Learning With Domain Adaptation for Few-Shot Learning Under Domain Shift", ICLR 2019, 2019, 12.

Paka, Amit, "Why Chatbots Suck", https://medium.com/swlh/why-chatbots-suck-f9dad7a54d5c, Jan. 9, 2018, 5.

Ruff, Lukas, et al., "Deep One-Class Classification", Proceedings of the 35th International Conference on Machine Learning, Stockholm, Sweden, PMLR 80, 2018. Copyright 2018 by the author(s)., 2018, 10.

Ryu, Seonghan, et al., "Neural sentence embedding using only in-domain sentences for out-of-domain sentence detection in dialog systems", analarXiv:1807.11567v1 [cs.CL] Jul. 27, 2018, Jul. 27, 2018, 8.

Shu, Lei, et al., "DOC: Deep Open Classification of Text Documents", Proceedings of the 2017 Conference on Empirical Methods in Natural Language Processing, pp. 2911-2916 Copenhagen, Denmark, Sep. 7-11, 2017. c 2017 Association for Computational Linguistics, 2017, 6.

Snell, Jake, et al., "Prototypical Networks for Few-shot Learning", 31st Conference on Neural Information Processing Systems (NIPS 2017), Long Beach, CA, USA., 2017, 11.

Yu, Mo, et al., "Diverse Few-Shot Text Classification with Multiple Metrics", Proceedings of NAACL-HLT 2018, pp. 1206-1215 New Orleans, Louisiana, Jun. 1-6, 2018. c 2018 Association for Computational Linguistics, 2018, 10.

\* cited by examiner

OUT-OF-DOMAIN ENCODER TRAINING

BACKGROUND

The present disclosure relates to out-of-domain test vectors, and more specifically, to training an encoder using out-of-domain test vectors.

SUMMARY

According to an embodiment of the present disclosure, a computer-implemented method of training an encoder includes using an embedding network to generate prototypical vectors. Each prototypical vector is based on a corresponding label associated with a first domain. The computer-implemented method also includes using the embedding network to generate an in-domain test vector based on at least one data sample from a particular label associated with the first domain. The computer-implemented method also includes using the embedding network to generate an out-of-domain test vector based on at least one other data sample associated with a different domain. The computer-implemented method also includes comparing the prototypical vectors to the in-domain test vector to generate in-domain comparison values. The computer-implemented method further includes comparing the prototypical vectors to the out-of-domain test vector to generate out-of-domain comparison values. The computer-implemented method also includes modifying, based on the in-domain comparison values and the out-of-domain comparison values, one or more parameters of the embedding network to generate one or more modified parameters for the embedding network.

According to another embodiment of the present disclosure, an apparatus includes a processor and a memory coupled to the processor. The memory stores instructions that, when executed by the processor, cause the processor to perform operations including using an embedding network to generate prototypical vectors. Each prototypical vector is based on a corresponding label associated with a first domain. The operations also include using the embedding network to generate an in-domain test vector based on at least one data sample from a particular label associated with the first domain. The operations also include using the embedding network to generate an out-of-domain test vector based on at least one other data sample associated with a different domain. The operations also include comparing the prototypical vectors to the in-domain test vector to generate in-domain comparison values. The operations also include comparing the prototypical vectors to the out-of-domain test vector to generate out-of-domain comparison values. The operations also include modifying, based on the in-domain comparison values and the out-of-domain comparison values, one or more parameters of the embedding network to generate one or more modified parameters for the embedding network.

According to another embodiment of the present disclosure, a computer program product for training an encoder includes a computer readable storage medium having program instructions embodied therewith. The program instructions are executable by a processor to cause the processor to perform operations including using an embedding network to generate prototypical vectors. Each prototypical vector is based on a corresponding label associated with a first domain. The operations also include using the embedding network to generate an in-domain test vector based on at least one data sample from a particular label associated with the first domain. The operations also include using the embedding network to generate an out-of-domain test vector based on at least one other data sample associated with a different domain. The operations also include comparing the prototypical vectors to the in-domain test vector to generate in-domain comparison values. The operations also include comparing the prototypical vectors to the out-of-domain test vector to generate out-of-domain comparison values. The operations also include modifying, based on the in-domain comparison values and the out-of-domain comparison values, one or more parameters of the embedding network to generate one or more modified parameters for the embedding network.

DETAILED DESCRIPTION

Figure 1:
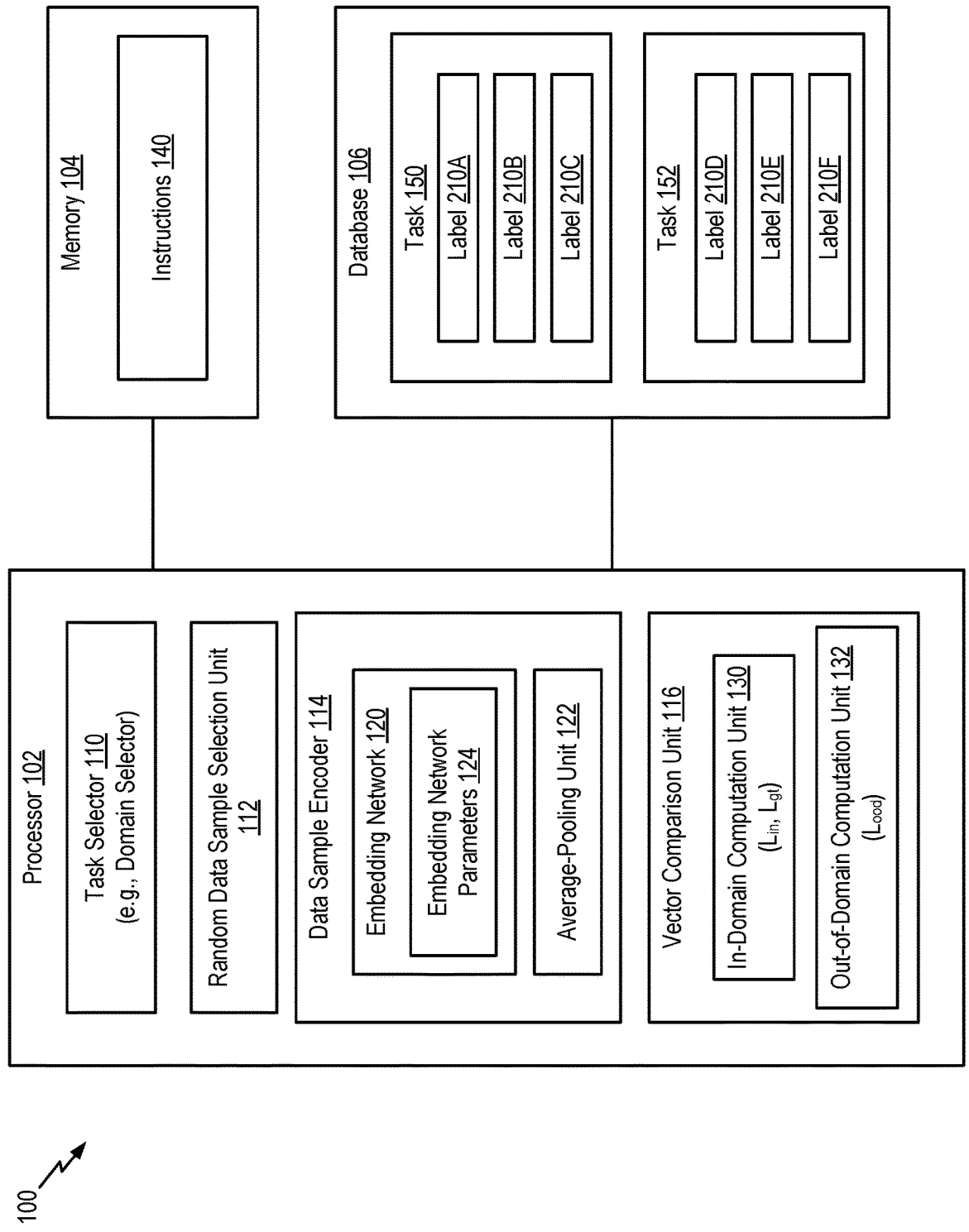
FIG. 1 is a block diagram of a system that is operable to train an encoder using an in-domain test vector and an out-of-domain test vector.

Particular implementations are described with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Text classification tasks in real-world computer applications include in-domain classification and out-of-domain detection components. In-domain classification refers to classifying a user's input with a label that is included in training data, and out-of-domain detection refers to designating a special out-of-domain tag to the user input if the user input does not belong to any of the labels in the in-domain training dataset. Out-of-domain detection operations and in-domain classification operations can require a significant amount of in-domain labeled data. However, most applications have limited in-domain labeled data (i.e., few-shot learning) and no out-of-domain labeled data (e.g., zero-shot learning).

The present disclosure is related to building a model that can detect out-of-domain inputs (e.g., "out-of-domain test vectors") with limited in-domain data (e.g., "data samples") and no out-of-domain training data, while classifying in-domain inputs (e.g., "in-domain test vectors") with a high accuracy. The present disclosure targets solving zero-shot out-of-domain detection problems for a few-shot meta-test data set $D=(D^{train}, D^{test})$ by training a transferable prototypical network model from large-scale independent source data sets $T=\{T_1, T_2, \ldots, T_N\}$ for dynamic construction of the meta-train set. Each task $T_i$ includes labeled training examples. The meta-test data set (D) is apart from the traditional supervised close-domain classification dataset. $D^{train}$ includes out-of-domain testing examples and $D^{test}$ includes labeled examples for the target domain. The training size for each label in $D^{train}$ can be relatively small (e.g., less than one-hundred examples).

According to the present disclosure, an out-of-domain resistant prototypical network for out-of-domain detection and few-shot in-domain classification trains a prototypical network on large scale independent source data sets (T) and directly performs prediction on the meta-test data sets (D) without additional training. During the meta-training, the out-of-domain resistant prototypical network increases the likelihood of a true label for an example (e.g., a data sample) in large scale independent source data sets (T) and samples an example from another meta-train task for the purpose of out-of-domain training by increasing the distance between the out-of-domain instance and the prototypical vector of each in-domain label.

For example, the out-of-domain resistant prototypical network samples a training task (Ti) from the large scale independent source data sets (T) and samples another task (Tj) from a different domain. The out-of-domain resistant prototypical network also samples an in-domain training example $x_i^{in}$ from the training task (Ti) and a simulated out-of-domain example $x_j^{out}$ from the other task (Tj). The out-of-domain resistant prototypical network samples N labels (e.g., N=4) from the training task (Ti) in addition to the label of the example $x_i^{in}$. For the ground-truth label and N negative labels, where N is an integer, the out-of-domain resistant prototypical network selects K training examples for each label, where K is an integer. If a label has less than K examples, the out-of-domain resistant prototypical network replicates the selected example to satisfy K. Therefore, (N+1)*K examples serve as a supporting set $S^{in}=\{S_i^{in}\}_{l=1}^{N}$.

An encoder can encode different phrases, words, and sentences to create vectors that are used to classify inputs (e.g., in-domain inputs) and train a classification model. Training the classification model can result in an increased ability for chat-bots to classify and process requests from a user. For example, given a batch of dynamically-constructed meta-train set $(x_i^{in}, x_j^{out}, S^{in})$, an encoder encodes the examples $x_i^{in}, x_j^{out}$ and the examples in the supporting set $S^{in}$ using a deep network. A prototypical vector representation for each label is generated by averaging all the examples' representations (e.g., vectors) of that label. The model can be improved by an objective function, defined by the parameters $x_i^{in}, x_j^{out}, S^{in}$. The out-of-domain resistant prototypical network can repeat the above-described operations for multiple epochs to train the model and can select the best model based on an independent meta-valid set $(T^{valid})$. The independent meta-valid set $(T^{valid})$ includes tasks that are homogeneous to the meta-test task (D).

A prototypical network, such as an embedded neural network, as described herein, minimizes a cross-entropy loss defined based on distance metrics between the example $x_i^{in}$ and the supporting sets using the equation $$L_{in} = -\log \frac{\exp \alpha F(x_i^{in}, S_{l_i}^{in})}{\sum_l \exp \alpha F(x_i^{in}, S_{l_i}^{in})},$$

where $l_i$ is the ground-truth label of $x_i$, and where $\alpha$ is a rescaling factor (e.g., hyper parameter). The function (F) is based on a cosine similarity between the encoded representations of x and the prototypical vector of a label.

The prototypical network defines a hinge loss on the example $x_j^{out}$ and the closest in-domain supporting set $S^{in}$ using the equation $L_{ood}=\max[0, \max(F(x_j^{out}, S_l^{in})-M_1)]$, where $M_1$ is a hyper-parameter. The prototypical network then uses randomly selected examples from another task far away from the prototypical vectors of the in-domain supporting sets. The prototypical network adds another loss to improve confidence of classifying in-domain labels using the equation $L_{gt}=\max[0, M_2-\max(F(x_i^{in}, S_i^{in}))]$, where $M_2$ is a hyper parameter.

The prototypical network improves the model based on the three losses using the equation $L=L_{in}+\beta L_{ood}+\gamma L_{gt}$, where $\beta$ and $\gamma$ are hyper-parameters.

One advantage provided by the systems, methods, and computer program products described herein is an ability to build a model that can detect out-of-domain inputs with limited in-domain data and zero out-of-domain training data. For example, by increasing the hinge loss on the example $x_j^{out}$ and the closest in-domain supporting set $S^{in}$, the model is trained to differentiate out-of-domain inputs (e.g., inputs that are not similar to the examples $x_i^{in}$ in the supporting set $S^{in}$) and in-domain data (e.g., examples $x_i^{in}$ in the supporting set $S^{in}$). Based on the differentiation, out-of-domain inputs can be more easily detected.

With reference to FIG. 1, a system 100 that is operable to train an encoder using an in-domain test vector and an out-of-domain test vector is shown. The system 100 includes a processor 102, a memory 104 coupled to the processor 102, and a database 106 coupled to the processor 106.

The processor 102 includes a task selector 110, a random data sample selection unit 112, a data sample encoder 114, and a vector comparison unit 116. The data sample encoder 114 includes an average-pooling unit 122 and is accessible to an embedding network 120. The vector comparison unit 116 includes an in-domain computation unit 130 and an out-of-domain computation unit 132. In a particular implementation, the task selector 110, the random data sample selection unit 112, the data sample encoder 114, and the vector comparison unit 116 correspond to hardware. For example, the elements 110-116 can be embodied in a processor (i.e., the processor 102), a controller, a field-programmable gate array (FPGA), an application-specific integrated circuit (ASIC), or another form of hardware. In other implementations, the operations described with reference to the elements 110-116 are performed by a processor executing computer-readable instructions, such as instructions 140 stored in the memory 104.

The database 106 stores tasks 150, 152 that are associated with different domains. As an illustrative example, the database 106 includes a first task 150 associated with a first domain (e.g., a "target" domain) and a second task 152 associated with a second domain (e.g., a "training source" domain). As a non-limiting example of domains, the first domain can be an auto insurance domain, and the second domain can be a home insurance domain. It should be understood the tasks 150, 152 can be associated with different domains in other implementations.

Each task 150, 152 or domain can include labels 210 for different categories. For example, the first task 150 can include a label 210A, a label 210B, and a label 210C. As a non-limiting example, if the first task 150 is associated with the auto insurance domain, the label 210A can be associated with a "purchase new auto insurance" category, the label 210B can be associated with a "submit a claim" category, and the label 210C can be associated with a "pay a monthly auto insurance premium" category. As another non-limiting example, if the second task 152 is associated with the home insurance domain, the labels 210D, 210E, 210F can be associated with different categories or functions related to home insurance.

Figure 2:
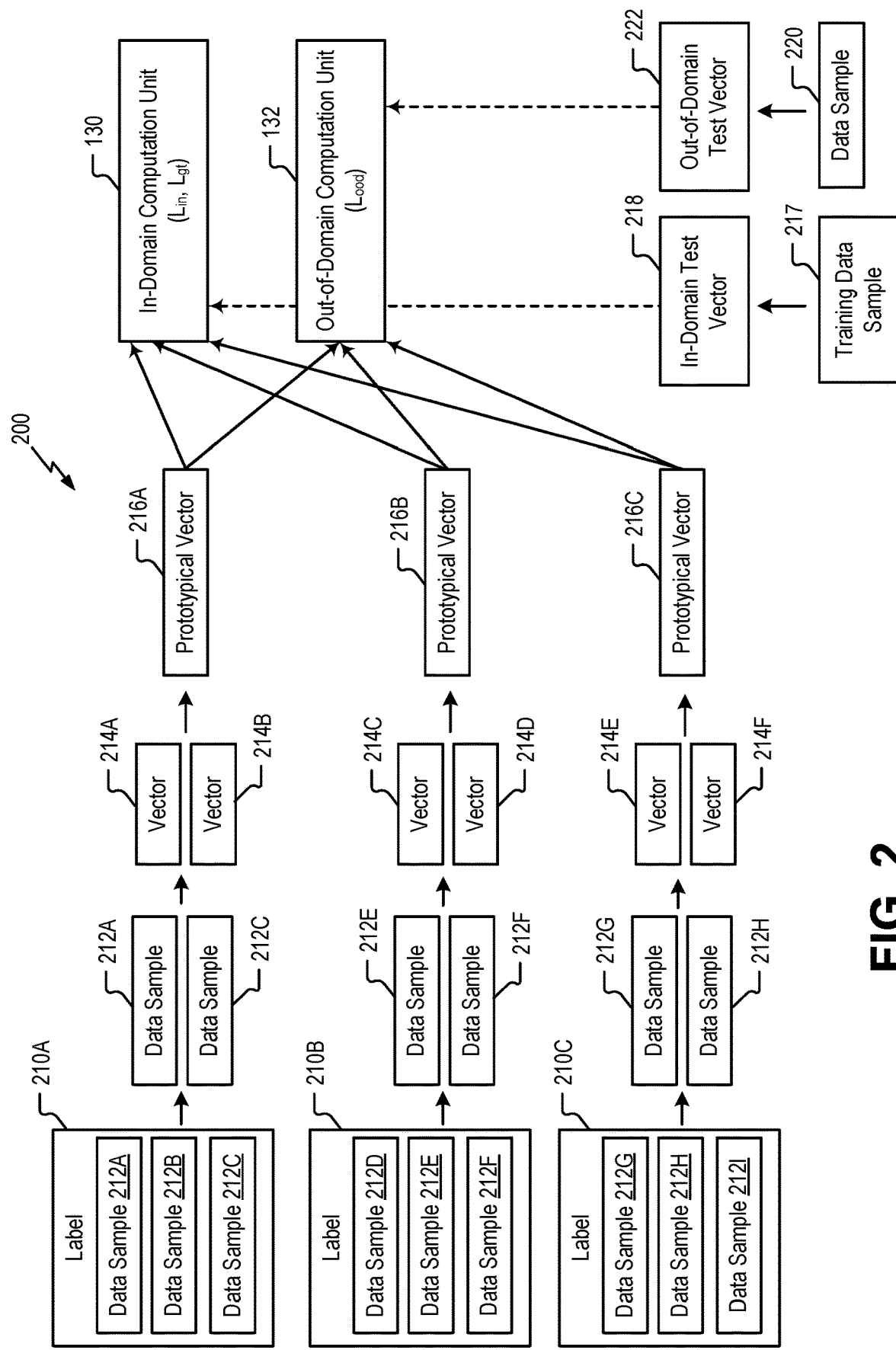
FIG. 2 illustrates an example of a method of training an encoder using an in-domain test vector and an out-of-domain test vector.

As explained in detail with respect to FIG. 2, the system 100 of FIG. 1 can perform different functions with respect to the labels 210 to train the data sample encoder 114 using an in-domain test vector (e.g., a vector associated with the first domain) and an out-of-domain test vector (e.g., a vector associated with a different domain). In particular, as described in greater detail with respect to FIG. 2, the system 100 can use the in-domain test vector to modify one or more embedding network parameters 124 (e.g., weights used to classify different data samples) such that a prototypical vector, associated with a true label of the in-domain test vector, has properties that are substantially similar to the in-domain test vector. Additionally, as described in greater detail with respect to FIG. 2, the system 100 can use the out-of-domain test vector to modify the embedding network parameters 124 such that the prototypical vectors (for each in-domain label) have properties that are substantially different than the out-of-domain test vector.

With reference to FIG. 2, an example 200 of training an encoder using an in-domain test vector and an out-of-domain test vector is shown. The operations illustrated in the example 200 can be performed by the processor 102 of FIG. 1. According to one implementation, the processor 102 can execute program instructions (e.g., the instructions 140) stored in a computer readable storage medium (e.g., the memory 104) to perform the operations illustrated in the example of FIG. 2.

The example 200 illustrates generating prototypical vectors 216 for each label based on random data samples 212 from labels 210. The prototypical vectors 216 are then compared to an in-domain test input (e.g., an in-domain test vector 218 generated from in-domain test data or an in-domain training data sample) an "out-of-domain" test input (e.g., an out-of-domain test vector 222 generated from out-of-domain test data). It should be noted that the out-of-domain test data is available, but has a different domain than the domain associated with the labels 210. Based on the comparison, a model is trained so that a distance between each prototypical vector 216 and an out-of-domain test vector 222 is relatively large. Training the model so that the distance between each prototypical vector 216 and the out-of-domain test vector 222 is large enables the model to more easily detect out-of-domain inputs when comparing out-of-domain inputs to the prototypical vectors 216. Additionally, the model is trained so that a distance between a particular prototypical vector 216 associated with a "true label" and the in-domain test vector 218 is relatively small. Training the model so that the distance between the particular prototypical vector 216 associated with the true label is small enables the model to more accurately classify in-domain input sample text.

In FIG. 2, three labels 210A, 210B, 210C associated with the first domain are illustrated. As described with respect to FIG. 1, the label 210A can be associated with the "purchase new auto insurance" category, the label 210B can be associated with the "submit a claim" category, and the label 210C can be associated with the "pay a monthly auto insurance premium" category. Although the above categories are for illustrative purposes only, for ease of description, unless otherwise noted, the above categories apply to the labels 210A-210C.

The label 210A includes a data sample 212A, a data sample 212B, and a data sample 212C. Each data sample 212A-212C can include a phrase, a sentence, or a word that is associated with the respective label 210A. For example, each data sample 212A-212C can include a phrase, a sentence, or a word that is associated with purchasing new auto insurance. To illustrate, the data sample 212A can include the phrase "buy new auto insurance", the data sample 212B can include the word "application", and the data sample 212C can include the phrase "purchase additional insurance for my car."

The label 210B includes a data sample 212D, a data sample 212E, and a data sample 212F. Each data sample 212D-212F can include a phrase, a sentence, or a word that is associated with the respective label 210B. For example, each data sample 212D-212F can include a phrase, a sentence, or a word that is associated with submitting an auto insurance claim. To illustrate, the data sample 212D can include the phrase "got into a traffic accident", the data sample 212E can include the word "wreck", and the data sample 212F can include the phrase "report a collision."

The label 210C includes a data sample 212G, a data sample 212H, and a data sample 212I. Each data sample 212G-212I can include a phrase, a sentence, or a word that is associated with the respective label 210C. For example, each data sample 212G-212I can include a phrase, a sentence, or a word that is associated with paying a monthly auto insurance premium. To illustrate, the data sample 212G can include the phrase "monthly bill", the data sample 212H can include the word "premium", and the data sample 212I can include the phrase "make a payment."

The task selector 110 is configured to select a target task (i.e., a target domain) from the database 106. As depicted in FIG. 2, if the target task corresponds to the task 150 associated with the first domain (e.g., the auto insurance domain), the labels 210A-210C are provided to the processor 102 for processing. The random data sample selection unit 112 is configured to randomly select a first group of one or more data samples from the label 210A associated with the first domain. To illustrate, in the example 200 of FIG. 2, the random data sample selection unit 112 randomly selects the data sample 212A and the data sample 212C from the label 210A. In a similar manner, the random data sample selection unit 112 is configured to randomly select a second group of one or more data samples from the label 210B associated with the first domain. For example, in the example 200 of FIG. 2, the random data sample selection unit 112 randomly selects the data sample 212E and the data sample 212F from the label 210B. Additionally, the random sample selection unit 112 is configured to randomly select a third group of one or more data samples from the label 210C associated with the first domain. To illustrate, in the example 200 of FIG. 2, the random data sample selection unit 112 randomly selects the data sample 212G and the data sample 212H from the label 210C. The randomly selected data samples 212 are provided to the data sample encoder 114.

The data sample encoder 114 is configured to use the embedding network 124 to encode each randomly selected data sample in the first group of one or more data samples to generate corresponding first sample vectors. To illustrate, using the embedding network 124, the data sample encoder 114 applies the embedding network parameters 124 to the data sample 212A to encode the data sample 212A and generate a first sample vector 214A that is representative of the data sample 212A. Additionally, using the embedding network 124, the data sample encoder 114 applies the embedding network parameters 124 to the data sample 212C to encode the data sample 212C and generate a first sample vector 214B that is representative of the data sample 212C. The first sample vectors 214A, 214B are provided to the average-pooling unit 122.

The data sample encoder 114 is also configured to use the embedding network 124 to encode each randomly selected data sample in the second group of one or more data samples to generate corresponding second sample vectors. To illustrate, using the embedding network 124, the data sample encoder 114 applies the embedding network parameters 124 to the data sample 212E to encode the data sample 212E and generate a second sample vector 214C that is representative of the data sample 212E. Additionally, using the embedding network 124, the data sample encoder 114 applies the embedding network parameters 124 to the data sample 212F to encode the data sample 212F and generate a second sample vector 214D that is representative of the data sample 212F. The second sample vectors 214C, 214D are provided to the average-pooling unit 122.

The data sample encoder 114 is also configured to use the embedding network 124 to encode each randomly selected data sample in the third group of one or more data samples to generate corresponding third sample vectors. To illustrate, using the embedding network 124, the data sample encoder 114 applies the embedding network parameters 124 to the data sample 212G to encode the data sample 212G and generate a third sample vector 214E that is representative of the data sample 212G. Additionally, using the embedding network 124, the data sample encoder 114 applies the embedding network parameters 124 to the data sample 212H to encode the data sample 212H and generate a third sample vector 214F that is representative of the data sample 212H. The third sample vectors 214E, 214F are provided to the average-pooling unit 122.

For in-domain test data, the average-pooling unit 122 is configured to perform an average-pooling operation on each embedding (e.g., sample vector 214) per label to generate a respective prototypical vector 216. To illustrate, the average-pooling unit 122 is configured to perform an average-pooling operation on the first sample vectors 214A, 214B to generate a first prototypical vector 216A that is representative of the label 210A. For example, the first prototypical vector 216A has encoded vector properties that are based on the randomly selected data samples 212A, 212C from the label 210A. As a result, when encoded, a phrase that is similar to a data sample 212A-212C from the label 210A should have similar encoded vector properties as the first prototypical vector 216A of the label 210A. To illustrate, if the phrase "new auto insurance application" is encoded into a vector, the encoded vector may have encoded vector properties that are similar to the first prototypical vector 216A.

The average-pooling unit 122 is also configured to perform the average-pooling operation on the second sample vectors 214C, 214D to generate a second prototypical vector 216B that is representative of the label 210B. For example, the second prototypical vector 216B has encoded vector properties that are based on the randomly selected data samples 212C, 212D from the label 210B. As a result, when encoded, a phrase that is similar to a data sample 212D-212F from the label 210B should have similar encoded vector properties as the second prototypical vector 216B of the label 210B. To illustrate, if the phrase "report a wreck" is encoded into a vector, the encoded vector may have encoded vector properties that are similar to the second prototypical vector 216B.

The average-pooling unit 122 is also configured to perform the average-pooling operation on the third sample vectors 214E, 214F to generate a third prototypical vector 216C that is representative of the label 210C. For example, the third prototypical vector 216C has encoded vector properties that are based on the randomly selected data samples 212E, 212F from the label 210C. As a result, when encoded, a phrase that is similar to a data sample 212G-212I from the label 210C should have similar encoded vector properties as the third prototypical vector 216C of the label 210C. To illustrate, if the phrase "pay my bill" is encoded into a vector, the encoded vector may have encoded vector properties that are similar to the third prototypical vector 216C.

The prototypical vectors 216 and an in-domain test vector 218 are provided to the in-domain computation unit 130. The in-domain test vector 218 is generated by the data sample encoder 114 using the embedding parameters 124 of the embedding network 120. For example, the in-domain test vector 218 can be generated by selecting and encoding a training data sample 217 associated with the first domain (e.g., the auto insurance domain). The training data sample 217 can be any data sample 212 from the first domain. As a non-limiting illustration, using the embedding network 124 and if the training data sample 217 is the data sample 212A, the data sample encoder 114 applies the embedding network parameters 124 to the data sample 212A to encode the data sample 212A and generate the in-domain test vector 218 that is representative of the data sample 212A. Thus, in this example, the in-domain test vector 218 has substantially similar properties as the first sample vector 214A. This process can be repeated for multiple data samples 212 in the first domain.

The in-domain computation unit 130 can determine a particular label that has a highest degree of similarity $\alpha(x_i^{in}, S_{l_i}^{in})$ to the in-domain test vector 218. For example, the in-domain computation unit 130 is configured to determine a maximum likelihood ($L_{in}$) of a true label 210 for a particular number (i) of training data samples. The maximum likelihood ($L_{in}$) of the true label 212 for a given training data sample (x) can be determined by $$L_{in} = -\log \frac{\exp\alpha(x_i^{in}, S_{l_i}^{in})}{\sum_l \exp\alpha(x_i^{in}, S_{l_i}^{in})},$$

where α is a scaling factor, and where S corresponds to selected data samples 212 associated with the training data sample 217. Thus, the in-domain computation unit 130 can use data samples 212 as the training data sample 217 to determine which data sample results in the maximum likelihood ($L_{in}$).

Upon determining the label 210 that corresponds to the maximum likelihood ($L_{in}$), the in-domain computation unit 130 is configured to minimize a distance ($L_{gt}$) between the in-domain test vector 218 and a particular prototypical vector 216 associated with the maximum likelihood ($L_{in}$) of the true label 210. The minimum distance ($L_{gt}$) is determined by $L_{gt}=\max[0, M_2-\max(F(x_i^{in}, S_l^{in}))]$, where $M_2$ is a constant. Additionally, upon determining the label 210 that corresponds to the maximum likelihood ($L_{in}$), the out-of-domain computation unit 130 is configured to maximize distances ($L_{ood}$) between an out-of-domain test vector 222 and the prototypical vectors 216. The data sample encoder 114 is configured to generate the out-of-domain test vector 222, using the embedding network 120, based on at least one other data sample 220 associated with a different domain. The maximum distance ($L_{ood}$) is determined by $L_{ood}=\max[0, \max(F(x_j^{out}, S_l^{in})-M_1)]$, where $M_1$ is a constant. A particular test vector, such as the out-of-domain test vector 222, can be classified as "out-of-domain" if a similarity $\alpha(x_i^{in}, S_{l_i}^{in})$ between the particular test vector and each prototypical vector 216 is lower than a threshold.

The processor 102 is configured to modify the embedding network parameters 124 based on in-domain comparison values (e.g., the maximum likelihood ($L_{in}$) and the minimum distance ($L_{gt}$)) and out-of-domain comparison values (e.g., the maximum distances ($L_{ood}$)). For example, if the in-domain computation unit 130 determines that the label 210A has the maximum likelihood ($L_{in}$) of being the true label, the processor 102 is configured to select particular embedding network parameters 124 that minimize the distance ($L_{gt}$) between the in-domain test vector 218 and the prototypical vector 216A and maximize the distances ($L_{ood}$) between the out-of-domain test vector 218 and the prototypical vectors 216A-216C. The selected parameters correspond to the modified embedding network parameters 124 used to train data sample encoder 114.

The techniques described with respect to FIGS. 1-2 enable generation of prototypical vectors 216 for each label 210 based on the randomly selected data samples 212 from the labels 210. The prototypical vectors 216 are then compared to an in-domain test input (e.g., an in-domain test vector 218 generated from in-domain test data or an in-domain training data sample) and an "out-of-domain" test input (e.g., an out-of-domain test vector 222 generated from out-of-domain test data). It should be noted that the out-of-domain test data is available, but has a different domain than the domain associated with the labels 210. Based on the comparison, a model (e.g., a text classification and detection model) is trained so that a distance between each prototypical vector 216 and an out-of-domain test vector 222 is relatively large. According to one implementation, training the model can include modifying the embedding network parameters 124 of the embedding network 120. Training the model so that the distance between each prototypical vector 216 and the out-of-domain test vector 222 is large enables the processor 102 to more easily detect out-of-domain inputs when comparing out-of-domain inputs to the prototypical vectors 216. Additionally, the model is trained so that a distance between a particular prototypical vector 216 associated with a "true label" and the in-domain test vector 218 is relatively small. Training the model so that the distance between the particular prototypical vector 216 associated with the true label is small enables the processor 102 to more accurately classify in-domain input sample text.

Figure 3:
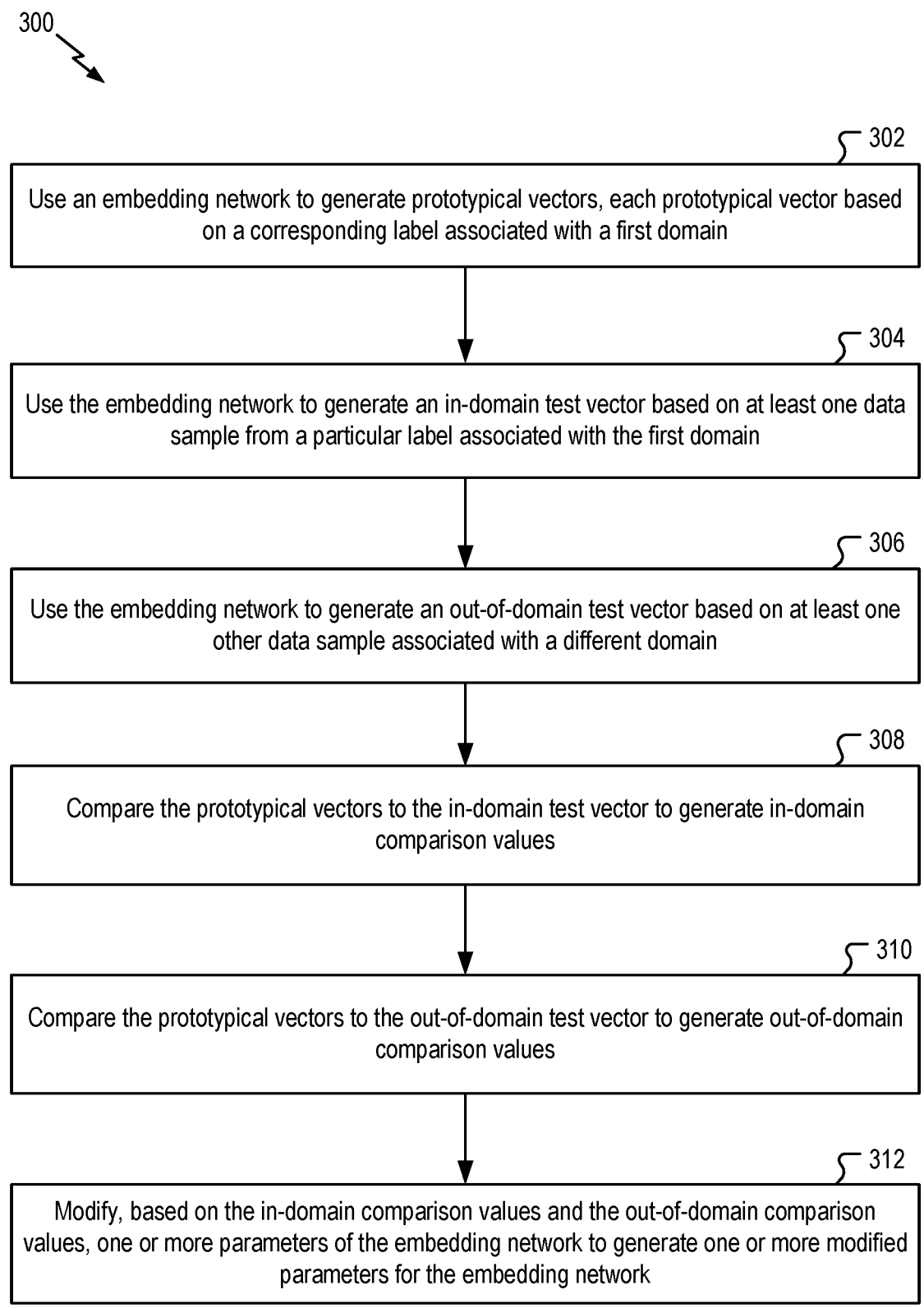
FIG. 3 is a flowchart of a method for training an encoder using an in-domain test vector and an out-of-domain test vector.

FIG. 3 is a flowchart of a method 300 for training an encoder. In an illustrative example, the method 300 is performed by the system 100 of FIG. 1.

The method 300 includes using an embedding network to generate prototypical vectors, at 302. Each prototypical vector is based on a corresponding label associated with a first domain. For example, referring to FIGS. 1-2, the average-pooling unit 122 performs the average-pooling operation on the first sample vectors 214A, 214B to generate the first prototypical vector 216A that is representative of the label 210A. Additionally, the average-pooling unit 122 performs the average-pooling operation on the second sample vectors 214C, 214D to generate the second prototypical vector 216B that is representative of the label 210B.

The method 300 also includes using the embedding network to generate an in-domain test vector based on at least one data sample from a particular label associated with the first domain, at 304. For example, referring to FIGS. 1-2, the data sample encoder 114 generates the in-domain test vector 218 by selecting and encoding a training data sample 217 associated with the first domain (e.g., the auto insurance domain). The training data sample 217 can be any data sample 212 from the first domain. As a non-limiting illustration, using the embedding network 124 and if the training data sample 217 is the data sample 212A, the data sample encoder 114 applies the embedding network parameters 124 to the data sample 212A to encode the data sample 212A and generate the in-domain test vector 218 that is representative of the data sample 212A. Thus, in this example, the in-domain test vector 218 has substantially similar properties as the first sample vector 214A.

The method 300 also includes using the embedding network to generate an out-of-domain test vector based on at least one other data sample associated with a different domain, at 306. For example, referring to FIGS. 1-2, the data sample encoder 114 generates the out-of-domain test vector 222, using the embedding network 120, based on at least one other data sample 220 associated with the different domain.

The method 300 also includes comparing the prototypical vectors to the in-domain test vector to generate in-domain comparison values, at 308. For example, referring to FIGS. 1-2, in-domain computation unit 130 is configured to determine a maximum likelihood ($L_{in}$) of a true label 210 for a particular number (i) of training data samples. The maximum likelihood ($L_{in}$) of the true label 212 for a given training data sample (x) can be determined by $$L_{in} = \frac{\exp\alpha(x_i^{in}, S_{l_i}^{in})}{\sum_i \exp\alpha(x_i^{in}, S_{l_i}^{in})},$$

where $\alpha$ is a scaling factor, and where S corresponds to selected data samples 212 associated with the training data sample 217. Additionally, the in-domain computation unit 130 is configured to minimize a distance ($L_{gt}$) between the in-domain test vector 218 and a particular prototypical vector 216 associated with the maximum likelihood ($L_{in}$) of the true label 210. The minimum distance ($L_{gt}$) is determined by $L_{gt} = \max[0, M_2 - \max(F(x_i^{in}, S_l^{in}))]$ The method 300 also includes comparing the prototypical vectors to the out-of-domain test vector to generate out-of-domain comparison values, at 310. For example, referring to FIGS. 1-2, the out-of-domain computation unit 130 maximizes distances ($L_{ood}$) between an out-of-domain test vector 222 and the prototypical vectors 216. The data sample encoder 114 generates the out-of-domain test vector 222, using the embedding network 120, based on at least one other data sample 220 associated with a different domain. The maximum distance ($L_{ood}$) is determined by $L_{ood} = \max[0, \max(F(x_j^{out}, S_l^{in}) - M_1)]$.

The method 300 also includes modifying, based on the in-domain comparison values and the out-of-domain comparison values, one or more parameter of the embedding network to generate one or more modified parameters for the embedding network, at 312. For example, referring to FIGS. 1-2, the processor 102 modifies the embedding network parameters 124 based on in-domain comparison values (e.g., the maximum likelihood ($L_{in}$) and the minimum distance ($L_{gt}$)) and out-of-domain comparison values (e.g., the maximum distances ($L_{ood}$)). If the in-domain computation unit 130 determines that the label 210A has the maximum likelihood ($L_{in}$) of being the true label, the processor 102 is configured to select particular embedding network parameters 124 that minimize the distance ($L_{gt}$) between the in-domain test vector 218 and the prototypical vector 216A and maximize the distances ($L_{ood}$) between the out-of-domain test vector 218 and the prototypical vectors 216A-216C. The selected parameters correspond to the modified embedding network parameters 124 used to train data sample encoder 114.

The method 300 generates prototypical vectors 216 for each label 210 based on the randomly selected data samples 212 from the labels 210. The prototypical vectors 216 are then compared to an in-domain test input (e.g., an in-domain test vector 218 generated from in-domain test data or an in-domain training data sample) and an "out-of-domain" test input (e.g., an out-of-domain test vector 222 generated from out-of-domain test data). It should be noted that the out-of-domain test data is available, but has a different domain than the domain associated with the labels 210. Based on the comparison, a model (e.g., a text classification and detection model) is trained so that a distance between each prototypical vector 216 and an out-of-domain test vector 222 is relatively large. According to one implementation, training the model can include modifying the embedding network parameters 124 of the embedding network 120. Training the model so that the distance between each prototypical vector 216 and the out-of-domain test vector 222 is large enables the processor 102 to more easily detect out-of-domain inputs when comparing out-of-domain inputs to the prototypical vectors 216. Additionally, the model is trained so that a distance between a particular prototypical vector 216 associated with a "true label" and the in-domain test vector 218 is relatively small. Training the model so that the distance between the particular prototypical vector 216 associated with the true label is small enables the processor 102 to more accurately classify in-domain input sample text.

Figure 4:
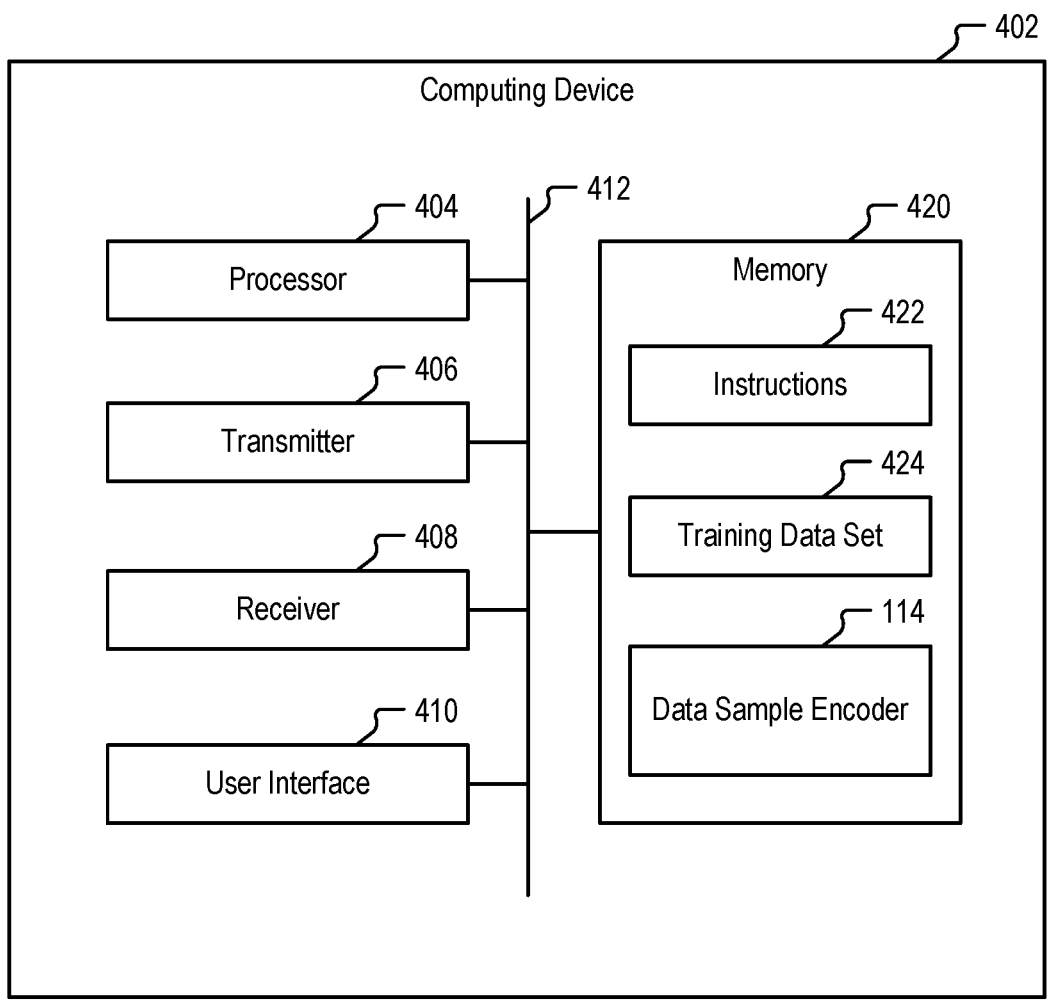
FIG. 4 is a block diagram of a computing device configured to train an encoder using an in-domain test vector and an out-of-domain test vector.

FIG. 4 illustrates a diagram of a computing device 402 configured to train the data sample encoder 114. The computing device 402 may include or correspond to a desktop computer, a laptop computer, a tablet computer, a server, a mainframe, or any other type of computing device.

The computing device 402 includes a processor 404, a transmitter 406, a receiver 408, a user interface 410, and a memory 420. The processor 404, the transmitter 406, the receiver 408, the user interface 410, and the memory 420 may be coupled together via a bus 412 (or other connection). The example illustrated in FIG. 4 is not intended to be limiting, and in other implementations, one or more of the processor 404, the transmitter 406, the receiver 408, the user interface 410, the bus 412, and the memory 420 are optional, or more components may be included in the computing device 402.

The transmitter 406 is configured to enable the computing device 402 to send data to one or more other devices via direct connection or via one or more networks, and the receiver 408 is configured to enable the computing device 402 to receive data from one or more other devices via direct connection or via one or more networks. The one or more networks may include Institute of Electrical and Electronics Engineers (IEEE) 802 wireless networks, Bluetooth networks, telephone networks, optical or radio frequency networks, or other wired or wireless networks. In some implementations, the transmitter 406 and the receiver 408 may be replaced with a transceiver that enables sending and receipt of data from one or more other devices.

The user interface 410 is configured to facilitate user interaction. For example, the user interface 410 is adapted to receive input from a user, to provide output to a user, or a combination thereof. In some implementations, the user interface 410 conforms to one or more standard interface protocols, including serial interfaces (e.g., universal serial bus (USB) interfaces or IEEE interface standards), parallel interfaces, display adapters, audio adaptors, or custom interfaces. In some implementations, the user interface 410 is configured to communicate with one or more input/output devices, such as some combination of buttons, keyboards, pointing devices, displays, speakers, microphones, touch screens, and other devices.

The memory 420 includes volatile memory devices (e.g., random access memory (RAM) devices), nonvolatile memory devices (e.g., read-only memory (ROM) devices, programmable read-only memory, and flash memory), or both. The memory 420 is configured to store instructions 422. The processor 404 is configured to execute the instructions 422 to perform the operations described herein. To illustrate, the processor 404 may execute the instructions 422 to obtain a training data set 424 and use the training data set 424 to generate and train the data sample encoder 114, in a similar manner to as described with reference to FIGS. 1-3.

Figure 5:
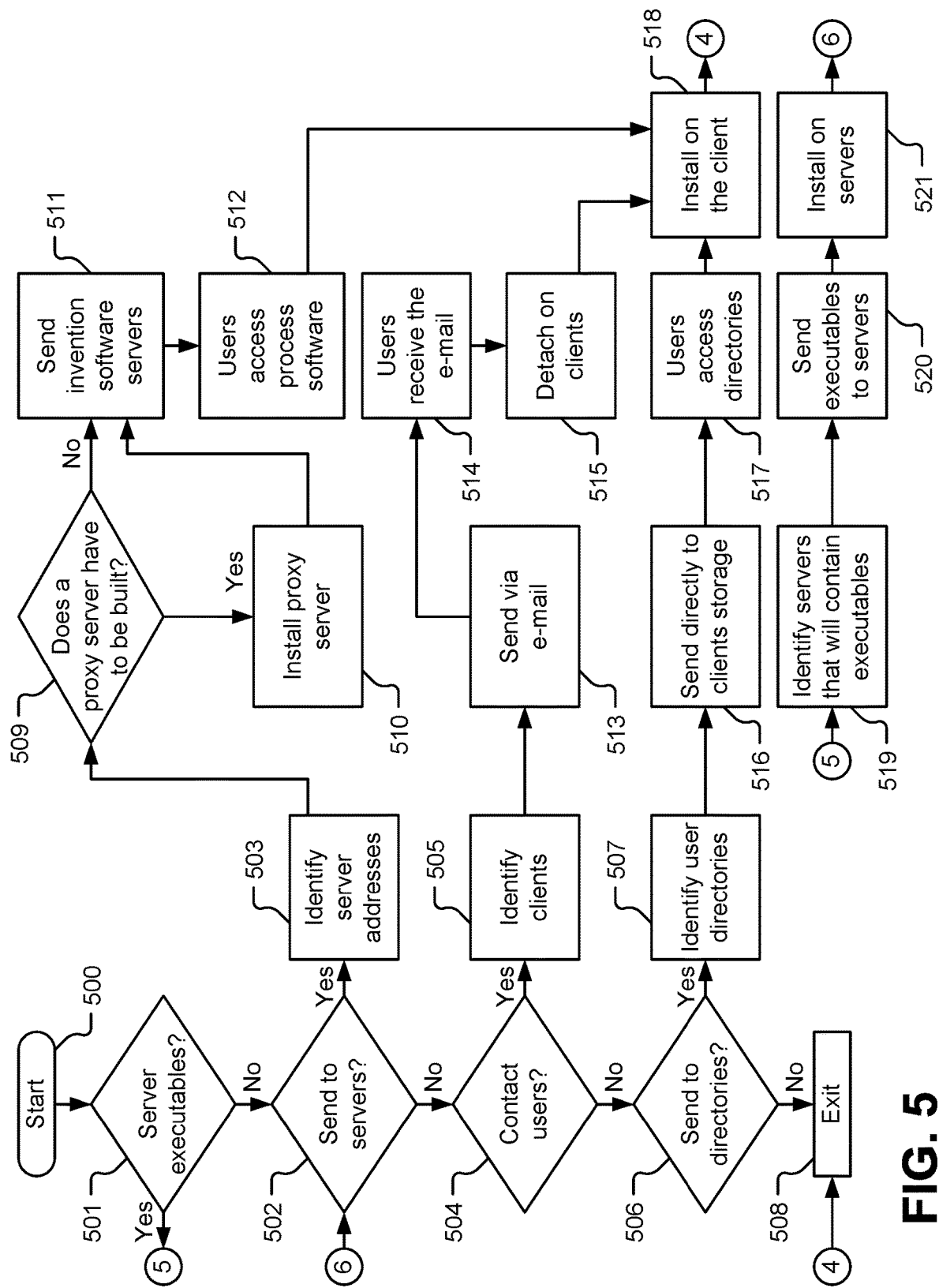
FIG. 5 is a flowchart that illustrates an example of a method of deploying an encoder using an in-domain test vector and an out-of-domain test vector.

FIG. 5 is a flowchart that illustrates an example of a method of deploying the data sample encoder 114 and the vector comparison unit 116 according to an implementation of the present invention. While it is understood that process software, such as the data sample encoder 114 or the vector comparison unit 116, may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 500 begins the deployment of the process software. An initial step is to determine if there are any programs that will reside on a server or servers when the process software is executed (501). If this is the case, then the servers that will contain the executables are identified (519). The process software for the server or servers is transferred directly to the servers' storage via FTP or some other protocol or by copying though the use of a shared file system (520). The process software is then installed on the servers (521).

Next, a determination is made on whether the process software is to be deployed by having users access the process software on a server or servers (502). If the users are to access the process software on servers, then the server addresses that will store the process software are identified (503).

A determination is made if a proxy server is to be built (509) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (510). The process software is sent to the (one or more) servers either via a protocol such as FTP, or it is copied directly from the source files to the server files via file sharing (511). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (512). Another embodiment is to have the servers automatically copy the process software to each client and then run the installation program for the process software at each client computer. The user executes the program that installs the process software on his client computer (518) and then exits the process (508).

In step 604 a determination is made whether the process software is to be deployed by sending the process software to users via e-mail. The set of users where the process software will be deployed are identified together with the addresses of the user client computers (505). The process software is sent via e-mail to each of the users' client computers (513). The users then receive the e-mail (514) and then detach the process software from the e-mail to a directory on their client computers (515). The user executes the program that installs the process software on his client computer (518) and then exits the process (508).

Lastly, a determination is made on whether the process software will be sent directly to user directories on their client computers (506). If so, the user directories are identified (507). The process software is transferred directly to the user's client computer directory (516). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (517). The user executes the program that installs the process software on his client computer (518) and then exits the process (508).

Figure 6:
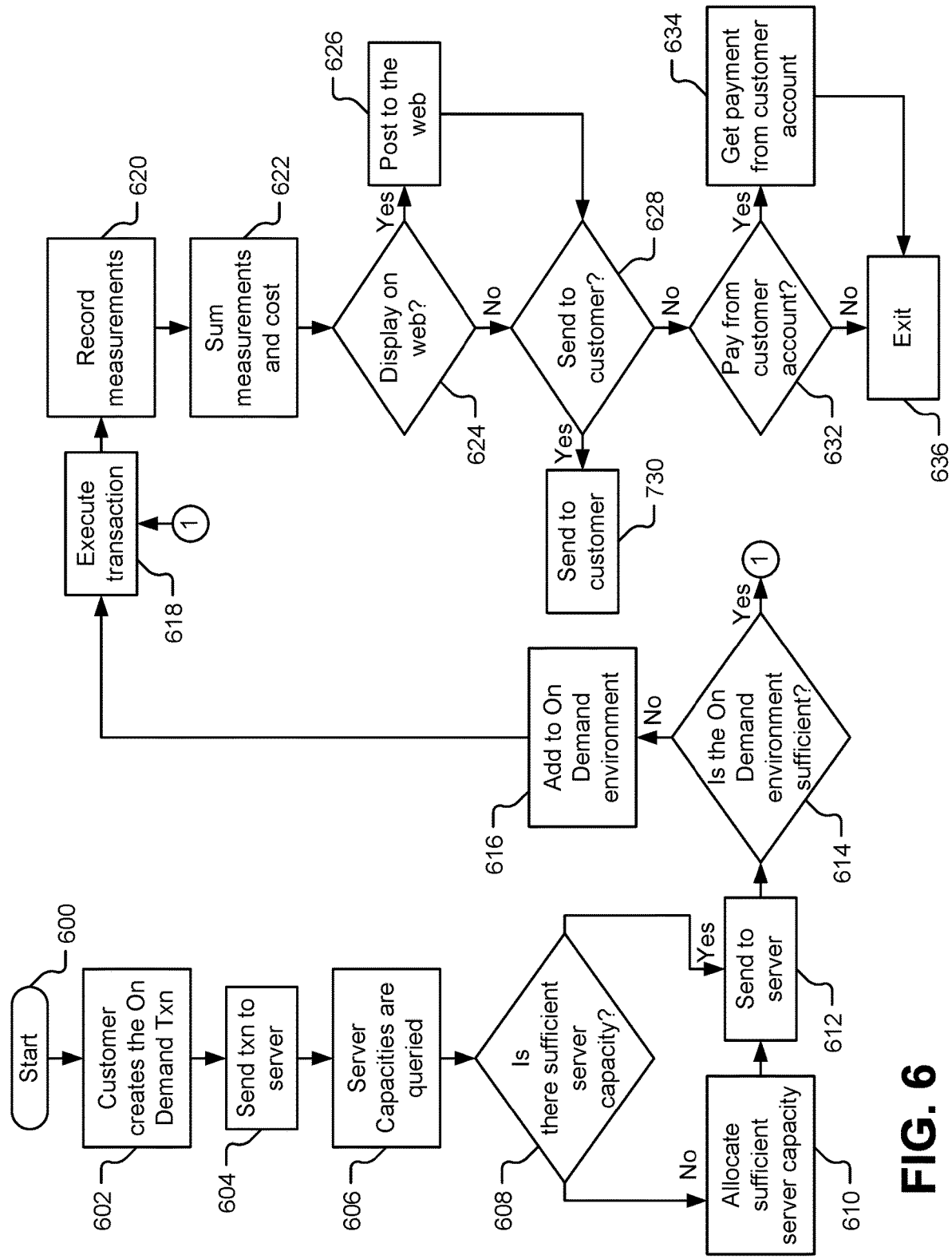
FIG. 6 is a flowchart that illustrates an example of using an encoder in an on demand context according to an implementation of the present disclosure.
Figure 7:
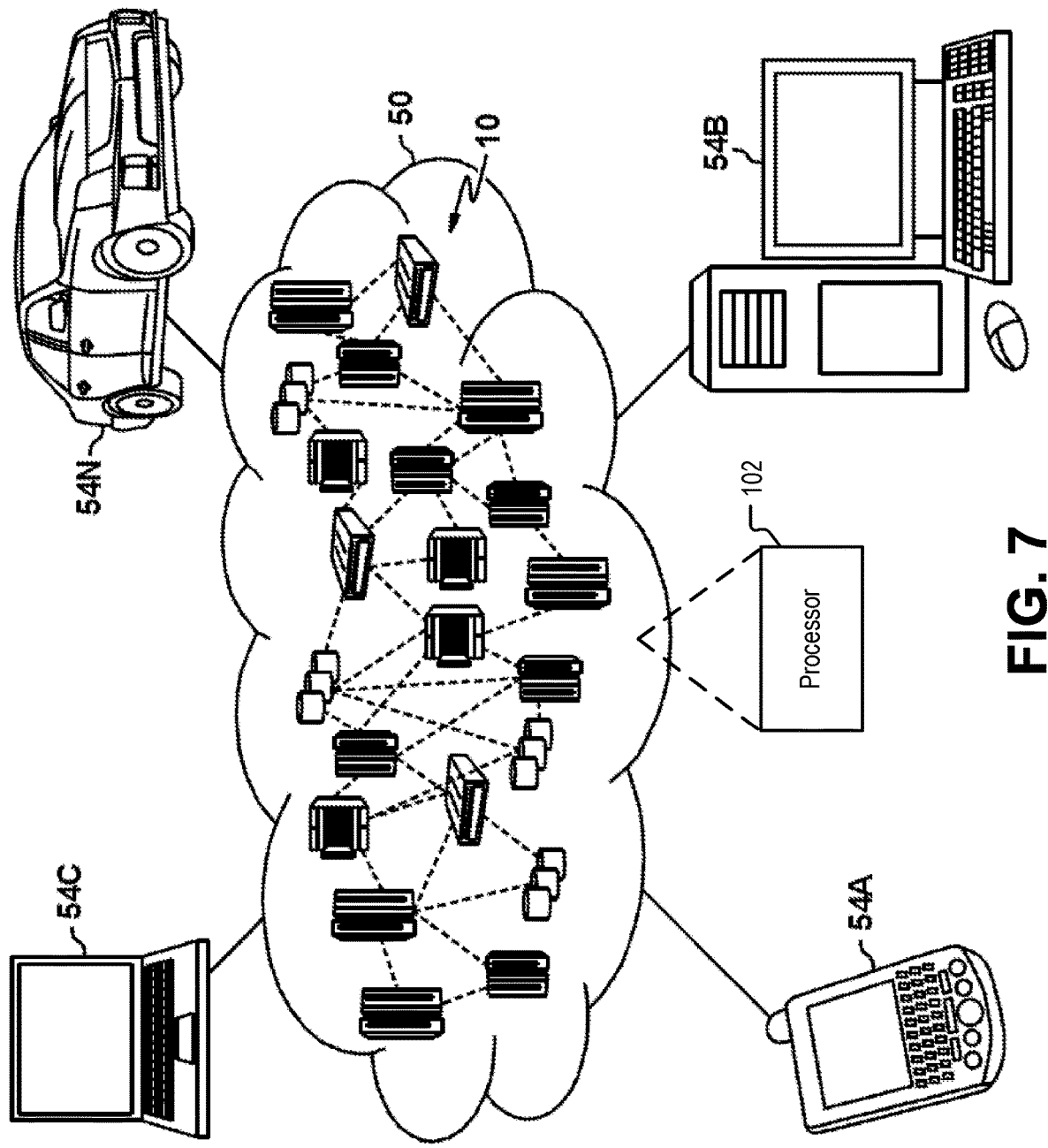
FIG. 7 depicts a cloud computing environment that includes an encoder according to an implementation of the present disclosure.

FIG. 6 is a flowchart that illustrates an example of a method of using the data sample encoder 114 and the vector comparison unit 116 in an on demand context. In FIG. 7, the process software, such as the data sample encoder 114 and the vector comparison unit 116, may also be shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Step 600 begins the On Demand process. A transaction is created that contains the unique customer identification, the requested service type, and any service parameters that further specify the type of service (602). The transaction is then sent to the main server (604). In an On Demand environment, the main server can initially be the only server, and then as capacity is consumed other servers are added to the On Demand environment.

The server central processing unit (CPU) capacities in the On Demand environment are queried (606). The CPU requirement of the transaction is estimated, and then the server's available CPU capacity in the On Demand environment is compared to the transaction CPU requirement to see if there is sufficient CPU available capacity in any server to process the transaction (608). If there is not sufficient server CPU available capacity, then additional server CPU capacity is allocated to process the transaction (610). If there was already sufficient available CPU capacity, then the transaction is sent to a selected server (612).

Before executing the transaction, a check is made of the remaining On Demand environment to determine if the environment has sufficient available capacity for processing the transaction. This environment capacity consists of such things as, but not limited to, network bandwidth, processor memory, storage etc. (614). If there is not sufficient available capacity, then capacity will be added to the On Demand environment (616). Next the required software to process the transaction is accessed, loaded into memory, and then the transaction is executed (618).

The usage measurements are recorded (620). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (622).

If the customer has requested that the On Demand costs be posted to a web site (624), then they are posted thereto (626). If the customer has requested that the On Demand costs be sent via e-mail to a customer address (628), then they are sent (630). If the customer has requested that the On Demand costs be paid directly from a customer account (632), then payment is received directly from the customer account (634). On Demand process proceeds to 636 and exits.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser). In a particular implementation, one or more of the nodes 10 include the processor 102 of FIG. 1.

Figure 8:
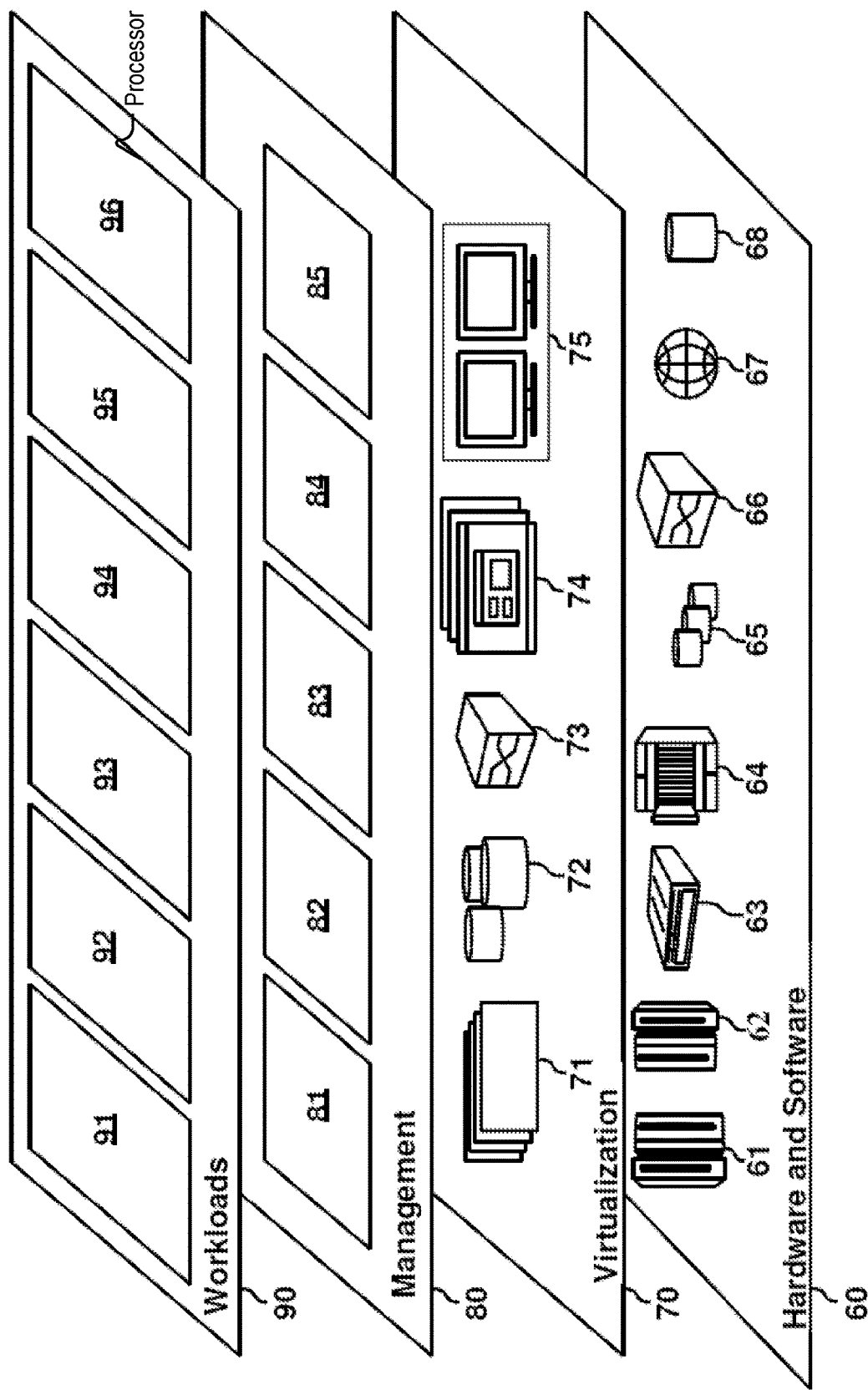
FIG. 8 depicts abstraction model layers provided by a cloud environment that includes an encoder according to an implementation of the present disclosure.

Referring to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and out-of-domain sentence detection 96. For example, the out-of-domain sentence detection 96 may use or have access to an out-of-domain sentence detector, such as the out-of-domain sentence detector 102 of FIG. 1 or the out-of-domain sentence detector 426 of FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of training an encoder, the computer-implemented method comprising:
   using an embedding network to generate prototypical vectors, each prototypical vector based on a corresponding label associated with a first domain;
   using the embedding network to generate an in-domain test vector based on at least one data sample from a particular label associated with the first domain;
   using the embedding network to generate an out-of-domain test vector based on at least one other data sample associated with a different domain;
   comparing the prototypical vectors to the in-domain test vector to generate in-domain comparison values;

comparing the prototypical vectors to the out-of-domain test vector to generate out-of-domain comparison values; and modifying, based on the in-domain comparison values and the out-of-domain comparison values, one or more parameters of the embedding network to generate one or more modified parameters for the embedding network.

2. The computer-implemented method of claim 1, wherein modifying the one or more parameters of the embedding network comprises modifying one or more weights of the embedding network.

3. The computer-implemented method of claim 1, further comprising determining a maximum likelihood of a true label based on the in-domain test vector, the in-domain test vector generated based on a training data sample selected from a label associated with the first domain.

4. The computer-implemented method of claim 3, wherein the maximum likelihood of the true label is determined based on $$L_{in} = \frac{expa(x_i^{in}, s_{l_i}^{in})}{\sum_l expa(x_i^{in}, s_{l_i}^{in})}.$$

5. The computer-implemented method of claim 3, wherein modifying the one or more parameters of the embedding network comprises:
selecting particular parameters that minimize a distance between the in-domain test vector and a particular prototypical vector associated with the maximum likelihood of the true label, wherein the particular parameters correspond to the one or more modified parameters.

6. The computer-implemented method of claim 5, wherein minimizing the distance between the out-of-domain test vector and the particular prototypical vector is based on $L_{gt} = max[0, M_2 - max(F(x_i^{in}, S_i^{in}))]$.

7. The computer-implemented method of claim 1, wherein modifying the one or more parameters of the embedding network comprises:
selecting particular parameters that maximize distances between the out-of-domain test vector and the prototypical vectors, wherein the particular parameters correspond to the one or more modified parameters.

8. The computer-implemented method of claim 7, wherein maximizing the distances between the out-of-domain test vector and the prototypical vectors is based on $L_{ood} = max[0, max(F(x_j^{out}, S_l^{in}) - M_1)]$.

9. The computer-implemented method of claim 1, further comprising:
randomly selecting a first group of one or more data samples from a first label associated with the first domain; and
randomly selecting a second group of one or more data samples from a second label associated with the first domain.

10. The computer-implemented method of claim 9, further comprising:
encoding, using the embedding network, each data sample in the first group of one or more data samples to generate corresponding first sample vectors; and
encoding, using the embedding network, each data sample in the second group of one or more data samples to generate corresponding second sample vectors.

11. The computer-implemented method of claim 10, further comprising:
performing an average-pooling operation on the first sample vectors to generate a first prototypical vector; and
performing the average-pooling operation on the second sample vectors to generate a second prototypical vector, wherein the prototypical vectors include at least the first prototypical vector and the second prototypical vector.

12. An apparatus comprising:
a processor; and
a memory coupled to the processor and storing instructions that, when executed by the processor, cause the processor to perform operations comprising:
using an embedding network to generate prototypical vectors, each prototypical vector based on a corresponding label associated with a first domain;
using the embedding network to generate an in-domain test vector based on at least one data sample from a particular label associated with the first domain;
using the embedding network to generate an out-of-domain test vector based on at least one other data sample associated with a different domain;
comparing the prototypical vectors to the in-domain test vector to generate in-domain comparison values;
comparing the prototypical vectors to the out-of-domain test vector to generate out-of-domain comparison values; and
modifying, based on the in-domain comparison values and the out-of-domain comparison values, one or more parameters of the embedding network to generate one or more modified parameters for the embedding network.

13. The apparatus of claim 12, wherein modifying the one or more parameters of the embedding network comprises modifying one or more weights of the embedding network.

14. The apparatus of claim 12, wherein the operations further comprise, for in-domain test data, performing an average pooling operation on each embedding per label to generate a respective prototypical vector.

15. The apparatus of claim 12, wherein the operations further comprise determining a particular label that has a highest degree of similarity $\alpha(x_i^{in}, S_{l_i}^{in})$ to the in-domain test vector.

16. The apparatus of claim 12, wherein the operations further comprise classifying a particular test vector as "out-of-domain" if a similarity $\alpha(x_i^{in}, S_{l_i}^{in})$ between the particular test vector and each prototypical vector is lower than a threshold.

17. A computer program product for training an encoder, the computer program product comprising a computer readable storage medium having program instructions embodied therewith, the program instructions executable by a processor to cause the processor to perform operations comprising:
using an embedding network to generate prototypical vectors, each prototypical vector based on a corresponding label associated with a first domain;
using the embedding network to generate an in-domain test vector based on at least one data sample from a particular label associated with the first domain;
using the embedding network to generate an out-of-domain test vector based on at least one other data sample associated with a different domain;
comparing the prototypical vectors to the in-domain test vector to generate in-domain comparison values;

comparing the prototypical vectors to the out-of-domain test vector to generate out-of-domain comparison values; and modifying, based on the in-domain comparison values and the out-of-domain comparison values, one or more parameters of the embedding network to generate one or more modified parameters for the embedding network.

18. The computer program product of claim 17, wherein modifying the one or more parameters of the embedding network comprises modifying one or more weights of the embedding network.

19. The computer program product of claim 17, wherein the operations further comprise, for in-domain test data, performing an average pooling operation on each embedding per label to generate a respective prototypical vector.

20. The computer program product of claim 17, wherein the operations further comprise determining a particular label that has a highest degree of similarity $\alpha(x_i^{in}, S_{j_i}^{in})$ to the in-domain test vector.

* * * * *